US010197437B2

(12) United States Patent
Du

(10) Patent No.: US 10,197,437 B2
(45) Date of Patent: Feb. 5, 2019

(54) METHOD AND APPARATUS FOR OBTAINING VIBRATION INFORMATION AND USER EQUIPMENT

(71) Applicant: BEIJING ZHIGU RUI TUO TECH CO., LTD., Beijing (CN)

(72) Inventor: Lin Du, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 0 days.

(21) Appl. No.: 15/526,261

(22) PCT Filed: Oct. 10, 2015

(86) PCT No.: PCT/CN2015/091607
§ 371 (c)(1),
(2) Date: May 11, 2017

(87) PCT Pub. No.: WO2016/078484
PCT Pub. Date: May 26, 2016

(65) Prior Publication Data
US 2017/0307436 A1 Oct. 26, 2017

(30) Foreign Application Priority Data

Nov. 17, 2014 (CN) .......................... 2014 1 0652928

(51) Int. Cl.
*G01H 3/12* (2006.01)
*G01H 9/00* (2006.01)
(52) U.S. Cl.
CPC ............... *G01H 9/00* (2013.01); *G01H 3/125* (2013.01)
(58) Field of Classification Search
CPC .................................. G01H 9/00; G01H 3/125
(Continued)

(56) References Cited

U.S. PATENT DOCUMENTS 6,721,429 B1 4/2004 Akamatsu et al.
7,373,823 B2 5/2008 Bosselmann et al.
(Continued)

FOREIGN PATENT DOCUMENTS

CN 1291067 4/2001
CN 1748129 3/2006
(Continued)

OTHER PUBLICATIONS

International Search Report and Written Opinion for Application No. PCT/CN2015/091607, dated Dec. 21, 2015, 9 pages.
(Continued)

*Primary Examiner* — J M Saint Surin
(74) *Attorney, Agent, or Firm* — Sheppard Mullin Richter & Hampton LLP

(57) ABSTRACT

Embodiments of the present application disclose a method and an apparatus for obtaining vibration information and a piece of user equipment. The method comprises: obtaining multiple groups of electromagnetic wave receiving signals corresponding to multiple receiving locations; obtaining, according to transmission channel information between the multiple receiving locations and the multiple reflective units and the multiple groups of electromagnetic wave receiving signals, multiple reflected electromagnetic wave signals respectively corresponding to the multiple reflective units; and obtaining, according to the multiple reflected electromagnetic wave signals, multiple pieces of vibration information respectively corresponding to the multiple reflective units. In technical solutions of the embodiments of the present application, obtaining sound information in an environment by using a wireless electromagnetic wave is especially applicable to some scenarios where an active component is not suitable for use at a sound collecting location and
(Continued)

a scenario where sound information at multiple locations needs to be collected in a space.

25 Claims, 8 Drawing Sheets

(58) Field of Classification Search
USPC .......................................................... 73/655
See application file for complete search history.

(56) References Cited

U.S. PATENT DOCUMENTS

| 7,397,421 | B2 | 7/2008 | Smith | |
|---|---|---|---|---|
| 9,142,121 | B2* | 9/2015 | Deng | H04M 1/72547 |
| 9,344,811 | B2* | 5/2016 | Bakish | A41D 13/11 |
| 2005/0265124 | A1 | 12/2005 | Smith | |
| 2008/0056724 | A1 | 3/2008 | Bakish | |
| 2010/0082273 | A1* | 4/2010 | Lakomiak | G05B 23/0216 |
| | | | | 702/56 |
| 2010/0280826 | A1* | 11/2010 | Bakish | G01H 9/00 |
| | | | | 704/226 |
| 2011/0175766 | A1 | 7/2011 | Peczalski et al. | |
| 2017/0314988 | A1* | 11/2017 | Du | G01H 11/06 |
| 2017/0322306 | A1* | 11/2017 | Du | G01H 9/00 |

FOREIGN PATENT DOCUMENTS

| CN | 102141430 | 8/2011 |
|---|---|---|
| CN | 102299753 | 12/2011 |
| CN | 102713667 | 10/2012 |
| CN | 104374463 | 2/2015 |
| DE | 19728653 | 1/1999 |
| JP | H11326514 | 11/1999 |
| NL | 1038090 | 1/2012 |
| RU | 2025669 | 12/1994 |
| SU | 1753296 | 8/1992 |
| WO | 01/14825 | 3/2001 |

OTHER PUBLICATIONS

Liu et al., "Ambient Backscatter: Wireless Communication Out of Thin Air," SIGCOMM, Aug. 2013, p. 27-38.
Pu et al., "Whole-Home Gesture Recognition Using Wireless Signals," In Proceedings of the 19th Annual International Conference on Mobile Computing & Networking (MobiCom '13), ACM, 2013, p. 27-38.
Wang et al., "We Can Hear You with Wi-Fi!," In Proceedings of the 20th Annual International Conference on Mobile Computing and Networking (MobiCom '14), ACM, 2014, p. 593-604.

* cited by examiner

METHOD AND APPARATUS FOR OBTAINING VIBRATION INFORMATION AND USER EQUIPMENT

CROSS-REFERENCE TO RELATED APPLICATIONS

This application is a National Phase Application of International Application No. PCT/CN2015/091607, filed on Oct. 10, 2015, which claims the benefit of priority to Chinese Patent Application No. 201410652928.8, filed on Nov. 17, 2014, and entitled "Method and Apparatus for Obtaining Vibration Information and User Equipment", each of which is incorporated by reference herein in its entirety.

TECHNICAL FIELD

The present application relates to a sound detection technology, and in particular, to a method and an apparatus for obtaining vibration information, and a piece of user equipment.

BACKGROUND

In some video recording, audio recording, and monitoring scenarios, sound information in an environment needs to be collected, for example, by a microphone. The microphone usually converts, by using a diaphragm, a sound vibration in the air to a vibration of the diaphragm, and converts the vibration of the diaphragm to a change in a current signal with a transducer.

SUMMARY

A possible objective of embodiments of the present application is to provide a vibration information obtaining technology.

In a first aspect, a possible implementation solution of the present application provides a method for obtaining vibration information, comprising:

obtaining multiple groups of electromagnetic wave receiving signals corresponding to multiple receiving locations, wherein each group of electromagnetic wave receiving signals in the multiple groups of electromagnetic wave receiving signals comprise multiple electromagnetic wave receiving signals respectively corresponding to multiple reflected electromagnetic wave signals, and the multiple reflected electromagnetic wave signals are formed by reflecting an electromagnetic wave signal by multiple reflective units of an electromagnetic wave reflective array when the multiple reflective units of the electromagnetic wave reflective array vibrate in response to a sound in an environment;

obtaining, according to transmission channel information between the multiple receiving locations and the multiple reflective units and the multiple groups of electromagnetic wave receiving signals, multiple reflected electromagnetic wave signals respectively corresponding to the multiple reflective units; and obtaining, according to the multiple reflected electromagnetic wave signals, multiple pieces of vibration information respectively corresponding to the multiple reflective units.

In a second aspect, a possible implementation solution of the present application provides an apparatus for obtaining vibration information, comprising:

a receiving signal obtaining module, configured to obtain multiple groups of electromagnetic wave receiving signals corresponding to multiple receiving locations;

each group of electromagnetic wave receiving signals in the multiple groups of electromagnetic wave receiving signals comprising multiple electromagnetic wave receiving signals respectively corresponding to multiple reflected electromagnetic wave signals, and the multiple reflected electromagnetic wave signals being formed by reflecting an electromagnetic wave signal by multiple reflective units of an electromagnetic wave reflective array when the multiple reflective units of the electromagnetic wave reflective array vibrate in response to a sound in an environment; and an analyzing and processing module, comprising:

a reflected signal obtaining unit, configured to obtain, according to transmission channel information between the multiple receiving locations and the multiple reflective units and the multiple groups of electromagnetic wave receiving signals, multiple reflected electromagnetic wave signals respectively corresponding to the multiple reflective units; and a vibration information obtaining unit, configured to obtain, according to the multiple reflected electromagnetic wave signals, multiple pieces of vibration information respectively corresponding to the multiple reflective units.

In a third aspect, a possible implementation solution of the present application provides a piece of user equipment, comprising the foregoing apparatus for obtaining vibration information.

In a fourth aspect, a possible implementation solution of the present application provides a computer readable storage device comprising executable instructions that, in response to execution, cause a device comprising a processor to perform operations, comprising:

obtaining multiple groups of electromagnetic wave receiving signals corresponding to multiple receiving locations, wherein each group of electromagnetic wave receiving signals in the multiple groups of electromagnetic wave receiving signals comprise multiple electromagnetic wave receiving signals respectively corresponding to multiple reflected electromagnetic wave signals, and the multiple reflected electromagnetic wave signals are formed by reflecting an electromagnetic wave signal by multiple reflective units of an electromagnetic wave reflective array when the multiple reflective units of the electromagnetic wave reflective array vibrate in response to a sound in an environment;

obtaining, according to the multiple groups of electromagnetic wave receiving signals and transmission channel information between the multiple receiving locations and the multiple reflective units, the multiple reflected electromagnetic wave signals respectively corresponding to the multiple reflective units; and obtaining, according to the multiple reflected electromagnetic wave signals, multiple pieces of vibration information respectively corresponding to the multiple reflective units.

In at least one implementation solution of the embodiments of the present application, by obtaining and analyzing the reflected electromagnetic wave signal, the vibration information and the vibration source direction information of the sound at the electromagnetic wave reflective array in the environment can be restored, that is, sound information in an environment can be obtained by using a wireless electromagnetic wave, which is especially applicable to some scenarios where an active component is not suitable for use at a sound collecting location and some scenarios where sound information at multiple locations needs to be collected in a space.

DETAILED DESCRIPTION

Figure 1:
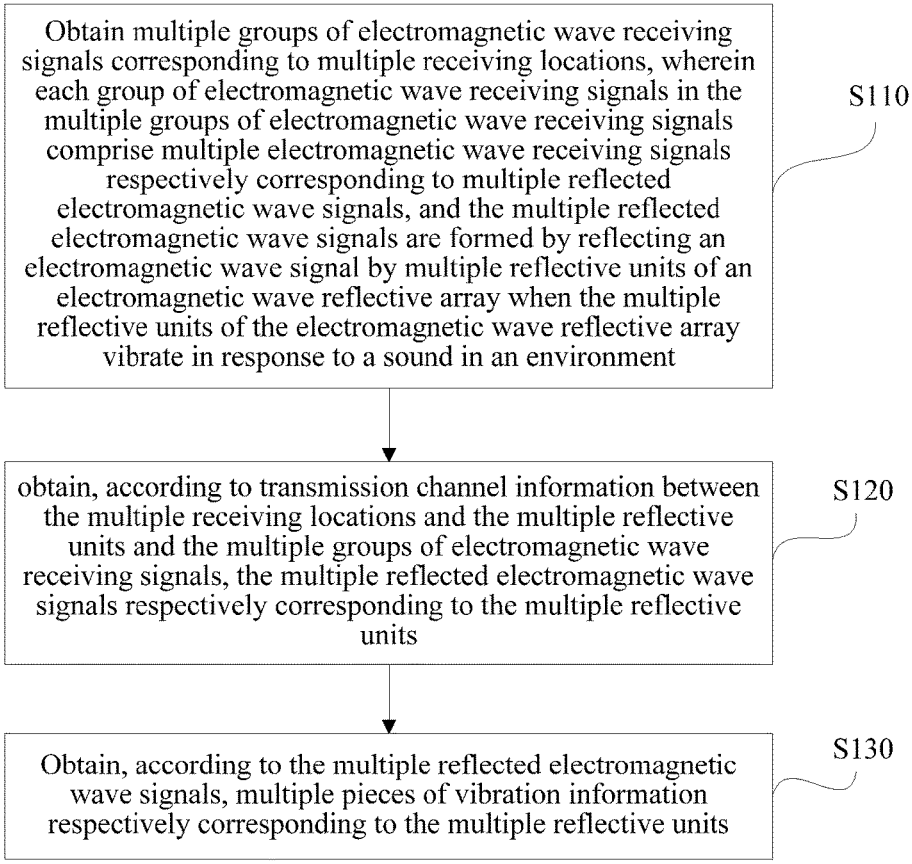
FIG. 1 is a schematic flowchart of a method for obtaining vibration information according to an embodiment of the present application.

Specific implementations of the present application are further described in detail below with reference to the accompanying drawings (in which like elements are denoted by like reference numerals) and embodiments. The following embodiments are intended to describe the present application, but not to limit the scope of the present application.

A person skilled in the art can understand that the terms in the present application such as "first", "second", and the like are only used to differentiate different steps, devices, or modules, and the like, and represent neither any specific technical meaning nor a certain logic sequence between them.

In the following description of the embodiments of the present application, the "sound" is not limited to the sound within the human hearing range, and any sound that can cause the electromagnetic wave reflective array to vibrate can be comprised in the protection scope of the present application.

As shown in FIG. 1, an embodiment of the present application provides a method for obtaining vibration information, comprising:

S110: obtain multiple groups of electromagnetic wave receiving signals corresponding to multiple receiving locations;

wherein each group of electromagnetic wave receiving signals in the multiple groups of electromagnetic wave receiving signals comprise multiple electromagnetic wave receiving signals respectively corresponding to multiple reflected electromagnetic wave signals, and the multiple reflected electromagnetic wave signals are formed by reflecting an electromagnetic wave signal by multiple reflective units of an electromagnetic wave reflective array when the multiple reflective units of the electromagnetic wave reflective array vibrate in response to a sound in an environment;

S120: obtain, according to transmission channel information between the multiple receiving locations and the multiple reflective units and the multiple groups of electromagnetic wave receiving signals, the multiple reflected electromagnetic wave signals respectively corresponding to the multiple reflective units; and S130: obtain, according to the multiple reflected electromagnetic wave signals, multiple pieces of vibration information respectively corresponding to the multiple reflective units.

In a possible implementation of the embodiment of the present invention, the multiple receiving locations and the multiple groups of electromagnetic wave receiving signals are in one-to-one correspondence, that is, one receiving location corresponds to one group of electromagnetic wave receiving signals.

In a possible implementation of the embodiment of the present application, the multiple reflective units and the multiple reflected electromagnetic wave signals are in one-to-one correspondence, that is, one reflective unit reflects the electromagnetic wave signal to form one reflected electromagnetic wave signal.

When the multiple reflected electromagnetic wave signals reaches a receiving location and are received by a receiving unit located at the receiving location, multiple electromagnetic wave receiving signals comprised in a group of electromagnetic wave receiving signals corresponding to the receiving location are formed.

In a possible implementation of the embodiment of the present application, the multiple reflective units and the multiple vibration information are in one-to-one correspondence.

For example, as an entity for executing the embodiment, an apparatus for obtaining vibration information provided in the present application executes S110 to S130. Specifically, the apparatus for obtaining vibration information can be set in a piece of use equipment by means of software, hardware, or a combination of software and hardware, or the apparatus for obtaining vibration information itself is the user equipment; and the user equipment comprises, but is not limited to, a smart phone, a computer, a tablet, a home gateway, and the like.

It can be seen from the foregoing description that, by using the foregoing implementation in the embodiment of the present application, the vibration information and the vibration source direction information of the sound at the electromagnetic wave reflective array in the environment can be restored, that is, sound information in an environment can be obtained by using a wireless electromagnetic wave, which is especially applicable to some scenarios where an active component is not suitable for use at a sound collecting location and some scenarios where sound information at multiple locations needs to be collected in a space.

Steps of the embodiment of the application are further described by using the following implementations.

In the following implementations of the embodiment of the present application, for the purpose of convenient description, M receiving locations and the electromagnetic wave reflective array comprising N reflective units are used as examples, wherein M and N are natural numbers.

In a possible implementation, the method further comprises:

forming, when the N reflective units of the electromagnetic wave reflective array vibrate in response to the sound in the environment, the N reflected electromagnetic wave signals by reflecting the electromagnetic wave signal by the N reflective units of the electromagnetic wave reflective array.

In the implementation of the present application, in one aspect, the N reflective units in the electromagnetic wave reflective array can vibrate in response to the sound in the environment, and in another aspect, the N reflective units in the electromagnetic wave reflective array can reflect the electromagnetic wave signal. That is, an electromagnetic wave reflective surface of each reflective unit in the electromagnetic wave reflective array can reflect the electromagnetic wave signal while vibrating, and because the sound causes a mechanical vibration of the electromagnetic wave reflective surface, according to the Doppler's principle, the vibration changes a spectrum characteristic of the N reflected electromagnetic wave signals, so that signals with frequency modulation characteristics are formed.

In a possible implementation, in an application scenario where sounds need to be collected, the electromagnetic wave reflective array can be set at a location where sounds need to be collected to reflect the electromagnetic wave signal.

Alternatively, in a possible implementation, in an application scenario where sounds need to be collected at multiple locations, multiple reflective units of the electromagnetic wave reflective array can be set at the multiple locations, so as to obtain vibration information of the multiple locations.

In a possible implementation, for example, the electromagnetic wave reflective array can be an electromagnetic wave reflective film array comprising N electromagnetic wave reflective films, that is, each electromagnetic wave reflective film is a reflective unit of the electromagnetic wave reflective array.

In a possible implementation, the N electromagnetic wave reflective films can be metallic films for example. In other possible implementations, the N electromagnetic wave reflective films can be films of other material(s), and printed antennas can be disposed on the reflective surfaces of the N electromagnetic wave reflective film.

In a possible implementation, the reflecting comprises directional reflecting. That is, the N reflective units directionally reflect the reflected electromagnetic wave signal to the M receiving locations.

In a possible implementation, the directional reflecting can be implemented by using a shape of the N reflective units. For example, in a possible implementation, each reflective unit is an electromagnetic wave reflective film with a reflective surface having a curved surface, and the M receiving locations are located at a reflection convergence region of the curved surface. In a possible implementation, the curved surface can be a paraboloid or an ellipsoidal surface.

In a possible implementation, the electromagnetic wave signal comprises an environmental electromagnetic wave signal such as a radio wave, an optical signal, and the like in an environment. That is, in the implementation, there is no need to emit another electromagnetic wave signal for reflecting, and the reflected electromagnetic wave signal is formed by reflecting the existing environmental electromagnetic wave signal in the environment. A person skilled in the art can see that, in the implementation, existing electromagnetic field information in the space can be reused and there is no need to emit an electromagnetic signal.

In another possible implementation, the electromagnetic wave signal comprises a modulated electromagnetic wave signal modulated by an orbital angular momentum. A person skilled in the art can know that, after a reflection, the angular momentum of the modulated electromagnetic wave signal changes, so the N reflected electromagnetic wave signals corresponding to the N reflective units comprise electromagnetic wave components conjugated with the angular momentum of the modulated electromagnetic wave signal. In some implementations, each receiving location of the M receiving locations receives not only corresponding N electromagnetic wave receiving signals but also the environmental electromagnetic wave signal and some source electromagnetic wave signals emit by an emitting end of the modulated electromagnetic wave signal, and by using a characteristic of the modulated electromagnetic wave signal (after a reflection, the angular momentum of the modulated electromagnetic wave signal changes), only the M groups of reflected electromagnetic wave signals conjugated with the modulated electromagnetic wave signal are obtained, so that interference brought by the source signals of the emitting end is avoided.

S110: Obtain M groups of electromagnetic wave receiving signals corresponding to M receiving locations.

In a possible implementation, for example, M electromagnetic wave receiving units located at the M receiving locations in one-to-one correspondence can be used to receive the M groups of electromagnetic wave receiving signals.

In another possible implementation, the M groups of electromagnetic wave receiving signals can be obtained from an external device (for example, the M receiving units described above) by using a communications module.

S120: Obtain, according to transmission channel information between the M receiving locations and the N reflective units and the M groups of electromagnetic wave receiving signals, the N reflected electromagnetic wave signals respectively corresponding to the N reflective units.

In a possible implementation, the transmission channel information can specifically comprise a transmission matrix H between the N reflective units and the M receiving locations.

For example, the transmission matrix H can be denoted by:

$$H = M \begin{bmatrix} h_{11} & h_{21} & \ldots\ldots & h_{N1} \\ h_{12} & h_{22} & \ldots\ldots & h_{N2} \\ . & . & \ldots\ldots & . \\ h_{1M} & h_{2M} & \ldots\ldots & h_{NM} \end{bmatrix}$$

with width $N$ wherein $h_{i,j}$ indicates a transmission relationship parameter between the $i^{th}$ reflective unit and the $j^{th}$ receiving location.

In a possible implementation, beside the transmission matrix H described above, the transmission channel information can also comprise white noise n in the environment.

In this implementation, for example, the relationship between the N reflected electromagnetic wave signals $S=\{S_1, S_2, \ldots, S_N\}^T$ and the M groups of electromagnetic wave receiving signals $y=y=\{y_1, y_2, \ldots, y_M\}^T$ can be:

y=Hs+n

Therefore, in the step S120, after the M groups of electromagnetic wave receiving signals and the transmission channel information are known, the N reflected electromagnetic wave signals can be obtained.

In a possible implementation, in the step S120, a multiple-input multiple-output (MIMO) receiving algorithm such as vertical bell-labs layered space-time (V-BLAST) can be used to calculate and obtain the N reflected electromagnetic wave signals. In the implementation, because of a algorithm requirement, M may be required to be smaller than N.

In a possible implementation, the transmission channel information can be known. For example, the transmission channel information is stored in a storage medium as a known quantity. To use the transmission channel information, read the transmission channel information directly.

In another possible implementation, the transmission channel information can be obtained through training, for example, in a possible implementation, the method can further comprise:

obtaining the transmission channel information through training.

Optionally, in a possible implementation, the obtaining the transmission channel information through training comprises:

obtaining N groups of training electromagnetic wave receiving signals corresponding to the N reflective units;

wherein in the N groups of training electromagnetic wave receiving signals, a group of training electromagnetic wave receiving signals corresponding to a reflective unit in the N reflective units comprise M training electromagnetic wave receiving signals, and the M training electromagnetic wave receiving signals are obtained by receiving, at the M receiving locations, a reflected training electromagnetic wave signal formed by reflecting a known training electromagnetic wave signal by the reflective unit; and obtaining, according to the training electromagnetic wave signal and the group of training electromagnetic wave receiving signals corresponding to each reflective unit in the N reflective units, the transmission channel information.

In a possible implementation, the method further comprises:

sending a corresponding training electromagnetic wave signal to each reflective unit in the N reflective units.

In the embodiment of the present application, during a process of obtaining the N groups of training electromagnetic wave receiving signals: in a possible implementation, a same training electromagnetic wave signal can be time-divisionally sent to the N reflective units, and the N groups of training electromagnetic wave receiving signals can be time-divisionally obtained; in another possible implementation, N different training electromagnetic wave signals can be sent to the N reflective units at the same time, and the N groups of training electromagnetic wave receiving signals are obtained at the M receiving locations at the same time.

A person skilled in the art can know that, the transmission channel information can be obtained by using the foregoing known N groups of training electromagnetic wave receiving signals and the corresponding reflected training electromagnetic wave signal.

In a possible implementation, if the surrounding environment of the N reflective units and the M receiving locations is relatively fixed, the transmission channel information can be obtained through training at only one time; and in a possible implementation, if the environment changes continuously, a corresponding training electromagnetic wave signal needs to be emitted periodically to revise estimation on the transmission channel information.

S130: Obtain, according to the N reflected electromagnetic wave signals, N pieces of vibration information corresponding to the N reflective units.

In a possible implementation, by using a change of spectrum distribution of the N reflected electromagnetic wave signals respectively corresponding to the N reflective units, the N pieces of vibration information respectively corresponding to the N reflective units in electromagnetic wave reflective array can be restored by utilizing a classic frequency modulation and demodulation method or a machine learning method.

A person skilled in the art can know that, sound information at locations where the N reflective units of the electromagnetic wave reflective array are located can be restored according to the N pieces of vibration information.

In a possible implementation, the method further comprises:

obtaining, according to the N pieces of vibration information, vibration source direction information corresponding to a location of the electromagnetic wave reflective array.

Because relative locations between the N reflective units in the electromagnetic wave reflective array are known, and according to a method for calculating an angle of arrival (for example, by using an algorithm such as a MUSIC algorithm or an ESPRIT algorithm), angles of the N pieces of vibration information can be obtained by using amplitudes and phases of the N pieces of vibration information, and then the vibration source direction information of a corresponding vibration at the electromagnetic wave reflective array can be obtained.

It is difficult for an individual electromagnetic wave reflective film to have vibration responses to sounds within a wide frequency range, so in a possible implementation, when the N reflective units in the electromagnetic wave reflective array are close to each other (for example, compared with distances between the N reflective units and the M receiving locations, distances between the N reflective units can be negligible), and vibration response characteristics of the N reflective units are different.

In the implementation, the method can further comprise:

obtaining, according to the vibration response characteristics of the N reflective units and the N pieces of vibration information, synthesized vibration information of the sound located at the electromagnetic wave reflective array.

In the implementation, the electromagnetic wave reflective array comprises N reflective units with different vibration response characteristics, so that obtained N pieces of vibration information corresponding to the N reflective units correspond to different pieces of sound information. For example, in a possible implementation, the N reflective units can vibrate in response to sounds within different frequency ranges respectively, that is, each reflective unit vibrates in response to a sound within a corresponding frequency range of the sound; the N pieces of vibration information respectively correspond to components of the sounds within different frequency ranges in the environment.

In the implementation, by synthesizing the N pieces of vibration information, the sound in the environment can be restored more completely in a wider frequency range, which results in better effect of the restored sound.

A person skilled in the art can understand that, in the foregoing methods of the specific implementations of the present application, the value of the serial number of each step does not mean an execution sequence, and the execution sequence of each step should be determined according to the function and internal logic thereof, and should not be any limitation to the implementation procedure of the specific implementations of the present application.

Figure 2:
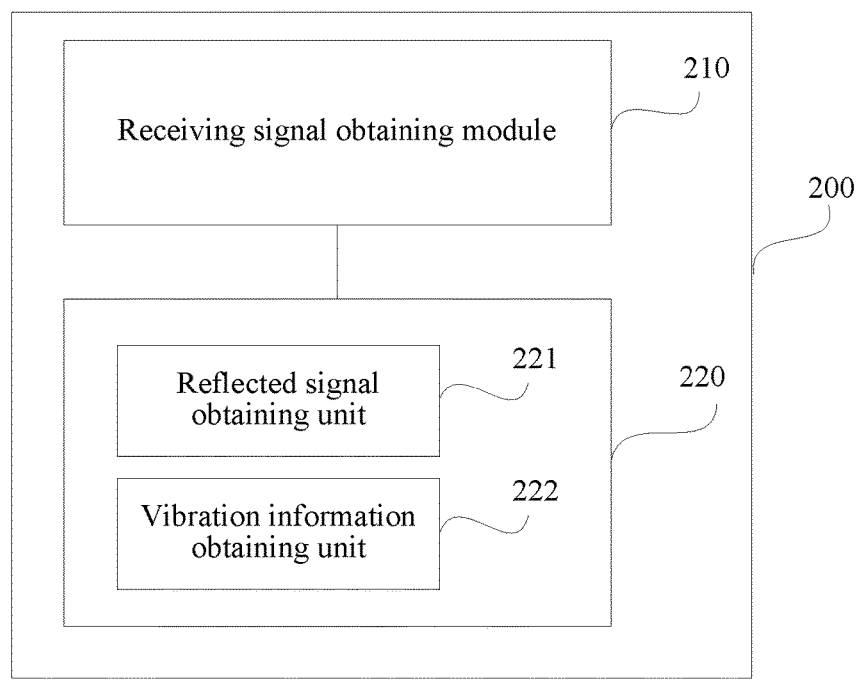
FIG. 2 is a schematic structural block diagram of an apparatus for obtaining vibration information, according to an embodiment of the present application.

As shown in FIG. 2, an embodiment of the present application provides an apparatus 200 for obtaining vibration information, comprising:

a receiving signal obtaining module 210, configured to obtain multiple groups of electromagnetic wave receiving signals corresponding to multiple receiving locations;

wherein each group of electromagnetic wave receiving signals in the multiple groups of electromagnetic wave receiving signals comprise multiple electromagnetic wave receiving signals respectively corresponding to multiple reflected electromagnetic wave signals, and the multiple reflected electromagnetic wave signals are formed by reflecting an electromagnetic wave signal by multiple reflective units of an electromagnetic wave reflective array when the multiple reflective units of the electromagnetic wave reflective array vibrate in response to a sound in an environment; and an analyzing and processing module 220, comprising:

a reflected signal obtaining unit 221, configured to obtain, according to transmission channel information between the multiple receiving locations and the multiple reflective units and the multiple groups of electromagnetic wave receiving signals, the multiple reflected electromagnetic wave signals respectively corresponding to the multiple reflective units; and a vibration information obtaining unit 222, configured to obtain, according to the multiple reflected electromagnetic wave signals, multiple pieces of vibration information respectively corresponding to the multiple reflective units.

In the embodiment of the present application, for the correspondence between signals, reflective units, receiving locations, and the like, refer to the corresponding description in the embodiment shown in FIG. 1, which is not described again herein.

It can be seen from the foregoing description that, by using the foregoing implementation in the embodiment of the present application, the vibration information and the vibration source direction information of the sound at the electromagnetic wave reflective array in the environment can be restored, that is, sound information in an environment can be obtained by using a wireless electromagnetic wave, which is especially applicable to some scenarios where an active component is not suitable for use at a sound collecting location and some scenarios where sound information at multiple locations needs to be collected in a space.

Modules and units of the embodiment of the application are further described by using the following implementations.

Figure 3A:
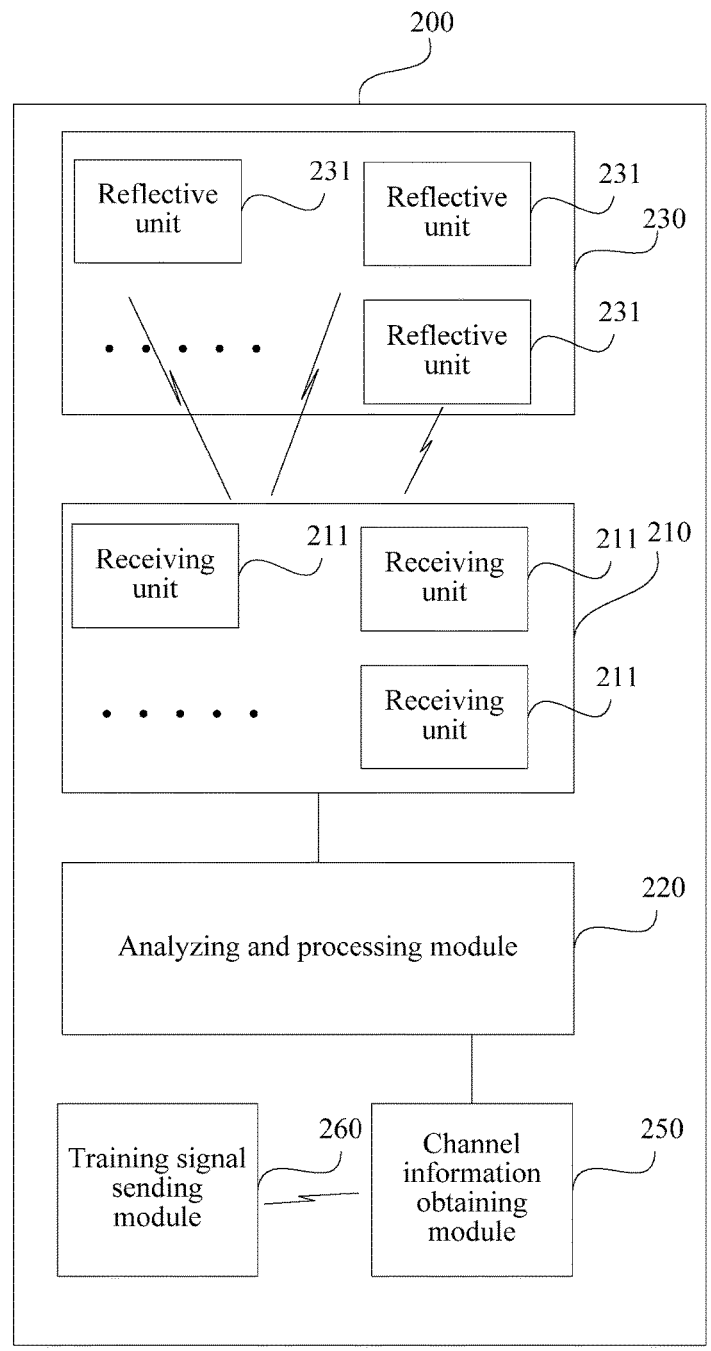
FIG. 3a and FIG. 3b are respectively schematic structural block diagrams of an apparatus for obtaining vibration information, according to an embodiment of the present application.

As shown in FIG. 3a, in a possible implementation, the apparatus 200 further comprises:

the electromagnetic wave reflective array 230 comprising the multiple reflective units 231, wherein the multiple reflective units 231 are configured to, when vibrating in response to the sound in the environment, reflect the electromagnetic wave signal to form the multiple reflected electromagnetic wave signals.

In a possible implementation, in an application scenario where sounds need to be collected, the electromagnetic wave reflective array 210 can be set at a location where sounds need to be collected to reflect the electromagnetic wave signal.

Alternatively, in a possible implementation, in an application scenario where sounds need to be collected at multiple locations, multiple reflective units 231 of the electromagnetic wave reflective array 230 can be set at the multiple locations where sounds need to be collected, so as to obtain vibration information of the multiple locations.

For further description about obtaining corresponding vibration information according to the multiple reflective units 231, refer to the corresponding description in the embodiment shown in FIG. 1.

In a possible implementation, for example, the electromagnetic wave reflective array can be an electromagnetic wave reflective film array comprising multiple electromagnetic wave reflective films, that is, each electromagnetic wave reflective film is a reflective unit of the electromagnetic wave reflective array.

In a possible implementation, each electromagnetic wave reflective film can be a metallic film for example. In other possible implementations, the each electromagnetic wave reflective film can be a film of another material, and a printed antenna is disposed on the reflective surface of each electromagnetic wave reflective films.

In a possible implementation, the reflecting comprises directional reflecting. That is, the multiple reflective units directionally reflect the reflected electromagnetic wave signal to the multiple receiving locations.

In a possible implementation, the directional reflecting can be implemented by using a shape of each reflective unit. For example, in a possible implementation, the each reflective unit is an electromagnetic wave reflective film with a reflective surface having a curved surface, and the multiple receiving locations are located at a reflection convergence region of the curved surface. In a possible implementation, the curved surface can be a paraboloid or an ellipsoidal surface.

In a possible implementation, the electromagnetic wave signal comprises an environmental electromagnetic wave signal such as a radio wave, an optical signal, and the like in an environment. That is, in the implementation, there is no need to emit another electromagnetic wave signal for reflecting, and the reflected electromagnetic wave signal is formed by reflecting the existing environmental electromagnetic wave signal in the environment. A person skilled in the art can see that, in the implementation, existing electromagnetic field information in the space can be reused and there is no need to emit an electromagnetic wave signal.

In another possible implementation, the electromagnetic wave signal comprises a modulated electromagnetic wave signal modulated by an orbital angular momentum.

Figure 3B:
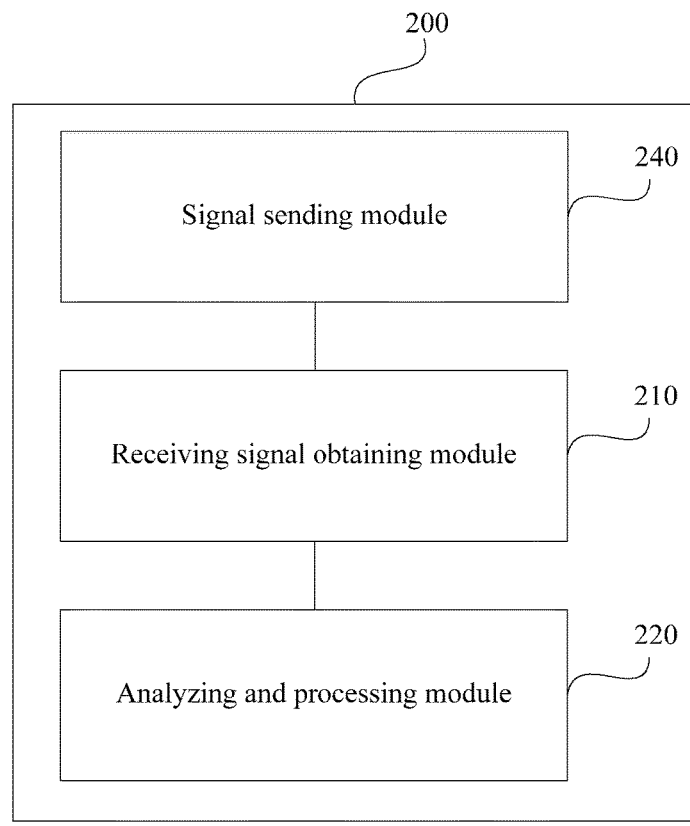

As shown in FIG. 3b, in a possible implementation, the apparatus 200 further comprises:

a signal sending module 240, configured to send the modulated electromagnetic wave signal.

A person skilled in the art can know that, after a reflection, the angular momentum of the modulated electromagnetic wave signal changes, so the multiple reflected electromagnetic wave signals corresponding to the multiple reflective units comprise an electromagnetic wave component conjugated with the angular momentum of the modulated electromagnetic wave signal. In some implementations, each receiving location of the multiple receiving locations receives not only corresponding multiple electromagnetic wave receiving signals but also the environmental electromagnetic wave signal and some source electromagnetic wave signals emit by an emitting end of the modulated electromagnetic wave signal, and by using a characteristic of the modulated electromagnetic wave signal (after a reflection, the angular momentum of the modulated electromagnetic wave signal changes), only the multiple groups of reflected electromagnetic wave signals conjugated with the modulated electromagnetic wave signal are obtained, so that interference brought by the source signals of the emitting end is avoided.

As shown in FIG. 3a, in a possible implementation, the receiving signal obtaining module 210 can comprise:

an electromagnetic wave receiving array comprising multiple receiving units 211 one-to-one corresponding to the multiple receiving locations, wherein the multiple receiving units 211 are configured to receive the multiple groups of electromagnetic wave receiving signals respectively.

Figure 3C:
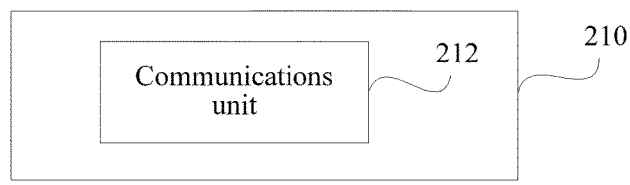
FIG. 3c is a schematic structural block diagram of a receiving signal obtaining module of an apparatus for obtaining vibration information, according to an embodiment of the present application.

As shown in FIG. 3c, in another possible implementation, the receiving signal obtaining module 210 can comprise:

a communications unit 212, configured to obtain the multiple groups of electromagnetic wave receiving signals from an external device (for example, the multiple receiving units described above).

In a possible implementation, the transmission channel information can specifically comprise a transmission matrix H between the multiple reflective units and the multiple receiving locations. For details, refer to the corresponding description in the embodiment shown in FIG. 1.

In another possible implementation, the transmission channel information can also comprise white noise n in the environment. For details, refer to the corresponding description in the embodiment shown in FIG. 1.

For further description about obtaining the multiple reflected electromagnetic wave signals according to the transmission channel information and the multiple electromagnetic wave receiving signals by the reflected signal obtaining unit 221, refer to the corresponding description in the embodiment shown in FIG. 1.

In a possible implementation, the transmission channel information can be known. For example, the apparatus further comprises a memory, configured to store the known transmission channel information. The reflected signal obtaining module 221 directly reads the transmission channel information from the memory.

In another possible implementation, the transmission channel information can be obtained through training, as shown in FIG. 3a, in a possible implementation, the apparatus 200 further comprises:

a channel information obtaining module 250, configured to obtain the transmission channel information through training.

Figure 3D:
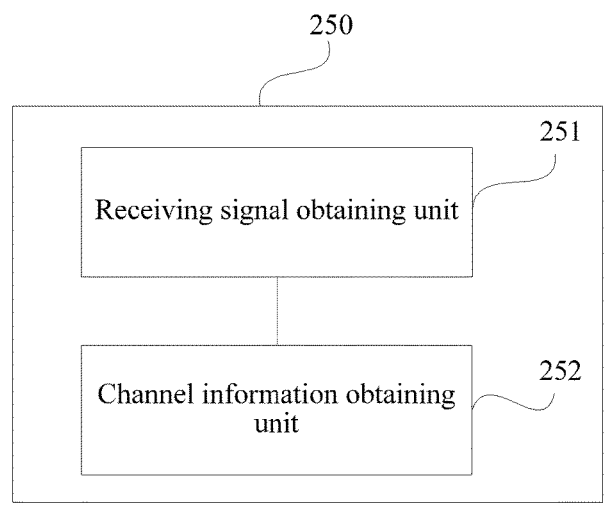
FIG. 3d is a schematic structural block diagram of a channel information obtaining module of an apparatus for obtaining vibration information, according to an embodiment of the present application.

As shown in FIG. 3d, in a possible implementation, the channel information obtaining module 250 comprises:

a receiving signal obtaining unit 251, configured to obtain multiple groups of training electromagnetic wave receiving signals respectively corresponding to the multiple reflective units;

wherein in the multiple groups of training electromagnetic wave receiving signals, a group of training electromagnetic wave receiving signals corresponding to a reflective unit in the multiple reflective units comprise multiple training electromagnetic wave receiving signals, and the multiple training electromagnetic wave receiving signals are obtained by receiving, at the multiple receiving locations, a reflected training electromagnetic wave signal formed by reflecting a training electromagnetic wave signal by the reflective unit; and channel information obtaining unit 252, configured to obtain, according to the training electromagnetic wave signal and the group of training electromagnetic wave receiving signals corresponding to each reflective unit in the multiple reflective units, the transmission channel information.

As shown in FIG. 3a, in a possible implementation, the apparatus 200 further comprises:

a training signal sending module 260, configured to send a corresponding training electromagnetic wave signal to each reflective unit in the multiple reflective units.

In a possible implementation, the training signal sending module 260 can time-divisionally send a same training electromagnetic wave signal to the multiple reflective units 231, and the receiving signal obtaining module 210 time-divisionally obtains the multiple groups of training electromagnetic wave receiving signals; and in another possible implementation, the training signal sending module 260 can also send multiple different training electromagnetic wave signals to the multiple reflective units 231 at the same time, and the receiving signal obtaining module 210 obtains the multiple groups of training electromagnetic wave receiving signals at the multiple receiving locations at the same time.

A person skilled in the art can know that, the transmission channel information can be obtained by using the foregoing known multiple groups of training electromagnetic wave receiving signals and the corresponding reflected training electromagnetic wave signal.

In a possible implementation, if the surrounding environment of the multiple reflective units and the multiple receiving locations is relatively fixed, the transmission channel information can be obtained through training at only one time, and then the transmission channel information can be used to reflect other unknown signals or known signals, comprising the environmental signal; and in a possible implementation, if the environment changes continuously, a corresponding training electromagnetic wave signal needs to be emitted periodically to revise the transmission channel information.

In the embodiment of the present application, for further description about the function implementation of the vibration information obtaining unit 222, refer to the corresponding description in the embodiment shown in FIG. 1, which is not described again herein.

Figure 3E:
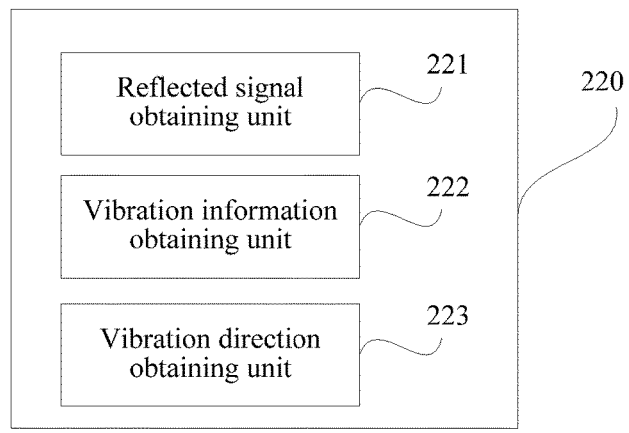
FIG. 3e and FIG. 3f are schematic structural block diagrams of an analyzing and processing module of an apparatus for obtaining vibration information, according to an embodiment of the present application.

As shown in FIG. 3e, in a possible implementation, the analyzing and processing module 220 further comprises:

a vibration direction obtaining unit 223, configured to obtain, according to the multiple pieces of vibration information, vibration source direction information corresponding to a location of the electromagnetic wave reflective array. For further description about the function implementation of the vibration direction obtaining unit 223, refer to the corresponding description in the embodiment shown in FIG. 1, which is not described again herein.

It is difficult for an individual electromagnetic wave reflective film to have vibration responses to sounds within a wide frequency range, so in a possible implementation, the multiple reflective units 231 have different vibration response characteristics.

Figure 3F:
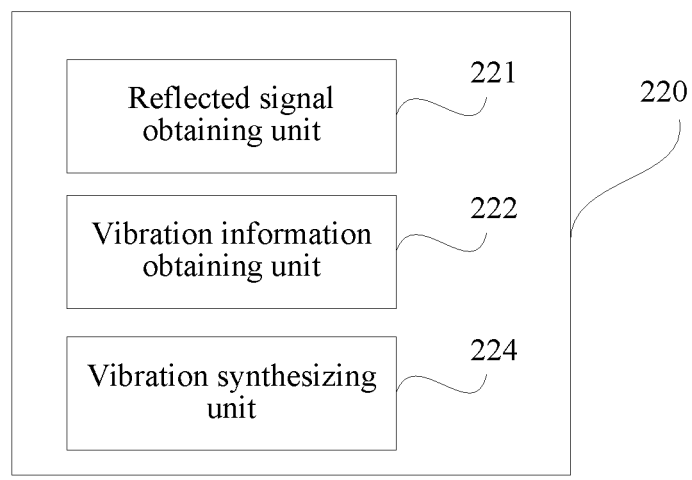

In the implementation, as shown in FIG. 3f, the analyzing and processing module 220 further comprises:

a vibration synthesizing unit 224, configured to obtain, according to the vibration response characteristics of the multiple reflective units and the multiple pieces of vibration information, synthesized vibration information of the sound located at the electromagnetic wave reflective array.

For further description about the function implementation of the vibration synthesizing unit 224, refer to the corresponding description in the embodiment shown in FIG. 1, which is not described again herein.

In the implementation, by synthesizing the multiple pieces of vibration information, the sound in the environment can be restored more completely in a wider frequency range, which results in better effect of the restored sound.

For further function implementations of modules and units of the apparatus 200 of the embodiment of the present application, refer to the corresponding descriptions in the embodiment shown in FIG. 1, which are not described again herein.

Figure 4:
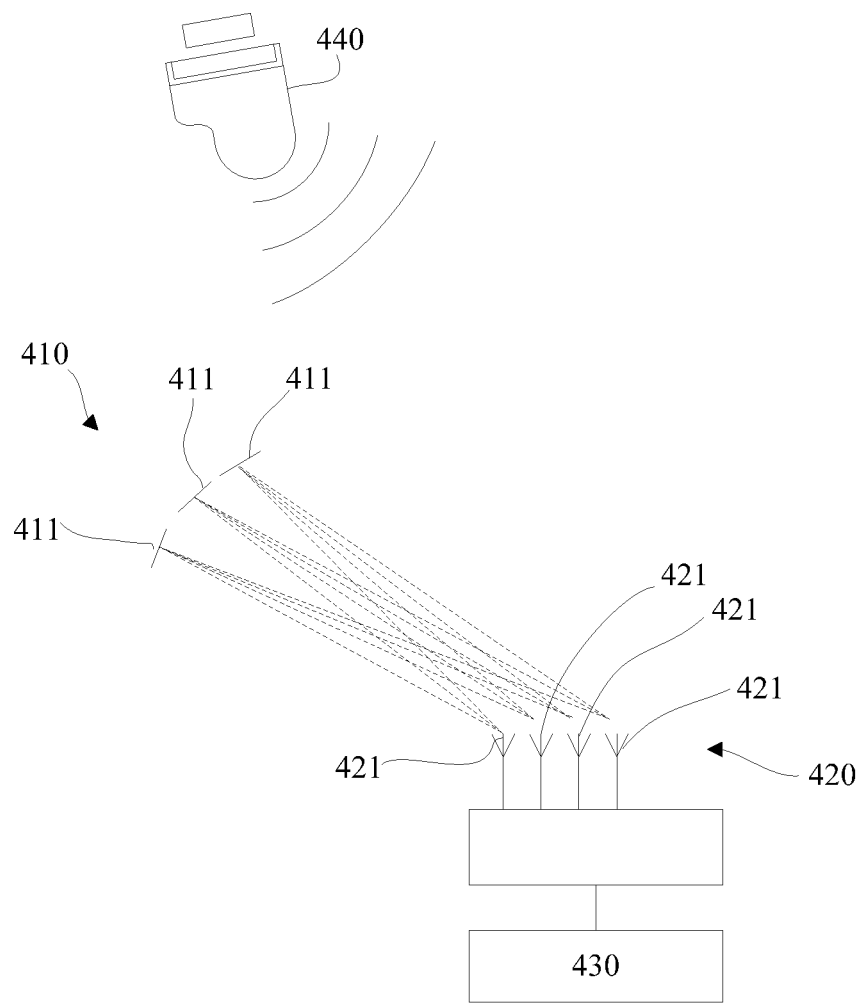
FIG. 4 is a schematic diagram of an application scenario of an apparatus for obtaining vibration information, according to an embodiment of the present application.

FIG. 4 shows a schematic diagram of an application scenario of contactless sound collection of sounds came from a musical instrument 440 according to an embodiment of the present application.

In the implementation, an apparatus according to the embodiment of the present application comprises:

an electromagnetic wave reflective array 410, wherein each electromagnetic wave reflective array 410 comprises three reflective units 411 with different vibration response characteristics;

a receiving signal obtaining module 420 comprising multiple receiving units 421, wherein each receiving unit 421 is configured to receive reflected electromagnetic wave signals reflected by the three reflective units 412 to obtain a group of electromagnetic wave receiving signals; and an analyzing and processing module 430, configured to analyze and process the multiple groups of electromagnetic wave receiving signals to obtain synthesized vibration information and vibration source direction information corresponding to a location of the electromagnetic wave reflective array 410.

It can be seen from FIG. 4 that, a sound came from the musical instrument 440 makes each reflective unit 411 of the electromagnetic wave reflective array 410 vibrate, and each reflective unit 411 of the electromagnetic wave reflective array 410 directionally reflect the corresponding reflected electromagnetic wave signal to each receiving unit 421 of the receiving signal obtaining module 420 while vibrating. After each receiving unit 421 of the receiving signal obtaining module 420 obtains the corresponding electromagnetic wave receiving signal, the analyzing and processing module 430 analyzes and processes the corresponding electromagnetic wave receiving signal, and then obtains vibration information and vibration source direction information corresponding to a location of the electromagnetic wave reflective array 410.

By using the implementation, vibration information and vibration source direction information of a sound within a wider frequency range can be obtained at the electromagnetic wave reflective array 410.

Figure 5:
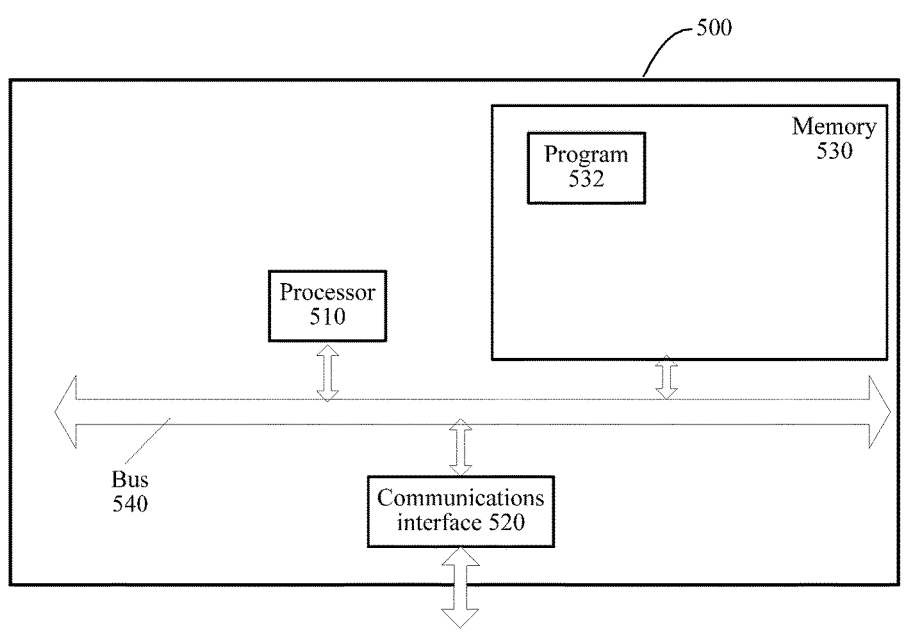
FIG. 5 is a schematic structural block diagram of an apparatus for obtaining vibration information, according to an embodiment of the present application.

FIG. 5 is a schematic structural diagram of another apparatus 500 for obtaining vibration information according to an embodiment of the present application. Specific embodiments of the present application are not intended to limit the specific implementation of apparatus 500 for obtaining vibration information. As shown in FIG. 5, the apparatus 500 for obtaining vibration information can comprise:

a processor 510, a communications interface 520, a memory 530, and a communications bus 540.

The processor 510, the communications interface 520, and the memory 530 communicate with each other by using the communications bus 540.

The communications interface 520 is configured to communicate with a network element such as a client.

The processor 510 is configured to execute a program 532. Specifically, the processor 510 can perform relevant steps in the foregoing method embodiment.

Specifically, the program 532 can comprise program code, wherein the program code comprises a computer operation instruction.

The processor 510 can be a central processing unit (CPU), an application specific integrated circuit (ASIC), or one or more integrated circuits configured to implement the embodiments of the present application.

The memory 530 is configured to store the program 532. The memory 530 can include a high-speed RAM memory, or can further include a non-volatile memory, for example, at least one disk memory. The program 532 can be specifically used to cause the apparatus 500 for obtaining vibration information to perform the following steps:

obtain multiple groups of electromagnetic wave receiving signals corresponding to multiple receiving locations, wherein each group of electromagnetic wave receiving signals in the multiple groups of electromagnetic wave receiving signals comprise multiple electromagnetic wave receiving signals respectively corresponding to multiple reflected electromagnetic wave signals, and the multiple reflected electromagnetic wave signals are formed by reflecting an electromagnetic wave signal by multiple reflective units of an electromagnetic wave reflective array when the multiple reflective units of the electromagnetic wave reflective array vibrate in response to a sound in an environment;

obtain, according to transmission channel information between the multiple receiving locations and the multiple reflective units and the multiple groups of electromagnetic wave receiving signals, multiple reflected electromagnetic wave signals respectively corresponding to the multiple reflective units; and obtain, according to the multiple reflected electromagnetic wave signals, multiple pieces of vibration information respectively corresponding to the multiple reflective units.

For specific implementations of the steps in the program 532, refer to the corresponding descriptions of corresponding steps and units in the foregoing embodiments, which are not described herein again. It can be clearly understood by a person skilled in the art that, for the purpose of convenient and brief description, for detailed working procedures of the foregoing devices and modules, reference can be made to the description of corresponding procedures in the foregoing method embodiments, and details are not described herein again.

Figure 6:
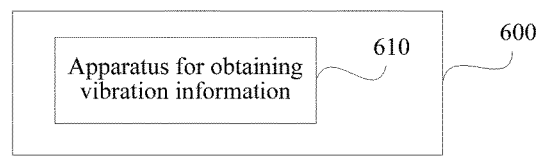
FIG. 6 is a schematic structural block diagram of a piece of user equipment, according to an embodiment of the present application.

As shown in FIG. 6, a possible implementation of an embodiment of the present application further provides a piece of user equipment 600, which comprises the apparatus 610 for obtaining vibration information described in the embodiments shown in FIG. 2, FIG. 3*a* to FIG. 3*f*, FIG. 4 or FIG. 5.

The user equipment 600 includes, but is not limited to, a smart phone, a computer, a tablet, a home gateway, and the like.

In at least one implementation solution of the embodiments of the present application, the vibration information and the vibration source direction information of the sound at the electromagnetic wave reflective array in the environment can be restored, that is, obtaining sound information in an environment by using a wireless electromagnetic wave is especially applicable to some scenarios where an active component is not suitable for use at a sound collecting location and a scenario where sound information at multiple locations needs to be collected in a space.

A person of ordinary skill in the art can be aware that, in combination with the examples described in the embodiments disclosed in this specification, units and method steps can be implemented by electronic hardware or a combination of computer software and electronic hardware. Whether these functions are executed as hardware or software depends upon the particular application and design constraint conditions of the technical solutions. A person skilled in the art can use different methods to implement the described functions for each particular application, but it should not be considered that the implementation goes beyond the scope of the present application.

When the functions are implemented in a form of a software functional unit and sold or used as an independent product, the functions can be stored in a computer-readable storage medium. Based on such an understanding, the technical solutions of the present application essentially, or the part contributing to the prior art, or some of the technical solutions can be implemented in a form of a software product. The computer software product is stored in a storage medium, and includes several instructions for instructing a computer device (which can be a personal computer, a server, or a network device) to perform all or some of the steps of the methods described in the embodiment of the present application. The foregoing storage medium includes: any medium that can store program code, such as a USB flash drive, a removable hard disk, a read-only memory (ROM), a random access memory (RAM), a magnetic disk, or an optical disc.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method for obtaining vibration information, comprising:
    obtaining multiple groups of electromagnetic wave receiving signals corresponding to multiple receiving locations, each group of electromagnetic wave receiving signals in the multiple groups of electromagnetic wave receiving signals comprising multiple electromagnetic wave receiving signals respectively corresponding to multiple reflected electromagnetic wave signals, and the multiple reflected electromagnetic wave signals being formed by reflecting an electromagnetic wave signal by multiple reflective units of an electromagnetic wave reflective array when the multiple reflective units of the electromagnetic wave reflective array vibrate in response to a sound in an environment;
    obtaining, according to the multiple groups of electromagnetic wave receiving signals and transmission channel information between the multiple receiving locations and the multiple reflective units, the multiple reflected electromagnetic wave signals respectively corresponding to the multiple reflective units; and
    obtaining, according to the multiple reflected electromagnetic wave signals, multiple pieces of vibration information respectively corresponding to the multiple reflective units.

2. The method of claim 1, wherein the method further comprises:
    obtaining, according to the multiple pieces of vibration information, vibration source direction information corresponding to a location of the electromagnetic wave reflective array.

3. The method of claim 1, wherein the method further comprises:
    obtaining the transmission channel information through training.

4. The method of claim 3, wherein the obtaining the transmission channel information through training comprises:
    obtaining multiple groups of training electromagnetic wave receiving signals corresponding to the multiple reflective units,
    in the multiple groups of training electromagnetic wave receiving signals, a group of training electromagnetic wave receiving signals corresponding to a reflective unit in the multiple reflective units comprising multiple training electromagnetic wave receiving signals, and the multiple training electromagnetic wave receiving signals being obtained by receiving, at the multiple receiving locations, a reflected training electromagnetic wave signal formed by reflecting a training electromagnetic wave signal by the reflective unit; and
    obtaining, according to the training electromagnetic wave signal and the group of training electromagnetic wave receiving signals corresponding to each reflective unit in the multiple reflective units, the transmission channel information.

5. The method of claim 4, wherein the method further comprises:
    sending a corresponding training electromagnetic wave signal to each reflective unit in the multiple reflective units.

6. The method of claim 1, wherein the group number of the multiple groups of electromagnetic wave receiving signals is not less than the number of the multiple reflective units.

7. The method of claim 1, wherein the reflecting comprises directional reflecting.

8. The method of claim 1, wherein the multiple reflective units have different vibration response characteristics; and
    the method further comprises: obtaining, according to the vibration response characteristics of the multiple reflective units and the multiple pieces of vibration information, synthesized vibration information of the sound located at the electromagnetic wave reflective array.

9. The method of claim 1, wherein the electromagnetic wave signal comprises an environmental electromagnetic wave signal.

10. The method of claim 1, wherein the electromagnetic wave signal comprises:
    a modulated electromagnetic wave signal modulated by an orbital angular momentum;
    wherein the multiple groups of electromagnetic wave receiving signals are conjugated with the modulated electromagnetic wave signal.

11. The method of claim 1, further comprising:
    forming, when the multiple reflective units of the electromagnetic wave reflective array vibrate in response to the sound in the environment, the multiple reflected electromagnetic wave signals by reflecting the electromagnetic wave signal by the multiple reflective units of the electromagnetic wave reflective array.

12. An apparatus for obtaining vibration information, comprising:
a receiving signal obtaining module, configured to obtain multiple groups of electromagnetic wave receiving signals corresponding to multiple receiving locations, each group of electromagnetic wave receiving signals in the multiple groups of electromagnetic wave receiving signals comprising multiple electromagnetic wave receiving signals respectively corresponding to multiple reflected electromagnetic wave signals, and the multiple reflected electromagnetic wave signals being formed by reflecting an electromagnetic wave signal by multiple reflective units of an electromagnetic wave reflective array when the multiple reflective units of the electromagnetic wave reflective array vibrate in response to a sound in an environment; and
an analyzing and processing module, comprising:
a reflected signal obtaining unit, configured to obtain, according to the multiple groups of electromagnetic wave receiving signals and transmission channel information between the multiple receiving locations and the multiple reflective units, the multiple reflected electromagnetic wave signals respectively corresponding to the multiple reflective units; and
a vibration information obtaining unit, configured to obtain, according to the multiple reflected electromagnetic wave signals, multiple pieces of vibration information respectively corresponding to the multiple reflective units.

13. The apparatus of claim 12, wherein the apparatus further comprises:
a vibration direction obtaining unit, configured to obtain, according to the multiple pieces of vibration information, vibration source direction information corresponding to a location of the electromagnetic wave reflective array.

14. The apparatus of claim 12, wherein the apparatus further comprises:
a channel information obtaining module, configured to obtain the transmission channel information through training.

15. The apparatus of claim 14, wherein the channel information obtaining module comprises:
a receiving signal obtaining unit, configured to obtain multiple groups of training electromagnetic wave receiving signals respectively corresponding to the multiple reflective units,
in the multiple groups of training electromagnetic wave receiving signals, a group of training electromagnetic wave receiving signals corresponding to a reflective unit in the multiple reflective units comprising multiple training electromagnetic wave receiving signals, and the multiple training electromagnetic wave receiving signals being obtained by receiving, at the multiple receiving locations, a reflected training electromagnetic wave signal formed by reflecting a training electromagnetic wave signal by the reflective unit; and
a channel information obtaining unit, configured to obtain, according to the training electromagnetic wave signal and the group of training electromagnetic wave receiving signals corresponding to each reflective unit in the multiple reflective units, the transmission channel information.

16. The apparatus of claim 15, wherein the apparatus further comprises:
a training signal sending module, configured to send a corresponding training electromagnetic wave signal to each reflective unit in the multiple reflective units.

17. The apparatus of claim 12, wherein the receiving signal obtaining module comprises:
an electromagnetic wave receiving array comprising multiple receiving units, wherein the multiple receiving units are configured to obtain the multiple groups of electromagnetic wave receiving signals respectively at the multiple receiving locations.

18. The apparatus of claim 17, wherein the number of the multiple receiving units is not less than the number of the multiple reflective units.

19. The apparatus of claim 12, wherein the multiple reflective units have different vibration response characteristics; and
the analyzing and processing module further comprises:
a vibration synthesizing unit, configured to obtain, according to the vibration response characteristics of the multiple reflective units and the multiple pieces of vibration information, synthesized vibration information of the sound located at the electromagnetic wave reflective array.

20. The apparatus of claim 12, wherein the electromagnetic wave signal comprises an environmental electromagnetic wave signal.

21. The apparatus of claim 12, wherein the electromagnetic wave signal comprises:
a modulated electromagnetic wave signal modulated by an orbital angular momentum; and
wherein the apparatus further comprises:
a signal sending module, configured to send the modulated electromagnetic wave signal;
wherein the multiple groups of electromagnetic wave receiving signals are conjugated with the modulated electromagnetic wave signal.

22. The apparatus of claim 21, further comprising:
the electromagnetic wave reflective array comprising the multiple reflective units, wherein the multiple reflective units are configured to, when vibrating in response to the sound in the environment, reflect the electromagnetic wave signal to form the multiple reflected electromagnetic wave signals.

23. The apparatus of claim 22, wherein
the multiple reflective units are further configured to directionally reflect the multiple reflected electromagnetic wave signals to the multiple receiving locations.

24. A user apparatus, comprising the apparatus for obtaining vibration information of claim 12.

25. A computer readable storage device comprising executable instructions that, in response to execution, cause a device comprising a processor to perform operations, comprising:
obtaining multiple groups of electromagnetic wave receiving signals corresponding to multiple receiving locations, wherein each group of electromagnetic wave receiving signals in the multiple groups of electromagnetic wave receiving signals comprise multiple electromagnetic wave receiving signals respectively corresponding to multiple reflected electromagnetic wave signals, and the multiple reflected electromagnetic wave signals are formed by reflecting an electromagnetic wave signal by multiple reflective units of an electromagnetic wave reflective array when the multiple reflective units of the electromagnetic wave reflective array vibrate in response to a sound in an environment;

obtaining, according to the multiple groups of electromagnetic wave receiving signals and transmission channel information between the multiple receiving locations and the multiple reflective units, the multiple reflected electromagnetic wave signals respectively corresponding to the multiple reflective units; and obtaining, according to the multiple reflected electromagnetic wave signals, multiple pieces of vibration information respectively corresponding to the multiple reflective units.

* * * * *